(12) United States Patent
Popp et al.

(10) Patent No.: US 9,507,093 B2
(45) Date of Patent: Nov. 29, 2016

(54) POLARIZATION MAINTAINING OPTICAL ROTARY JOINT

(75) Inventors: Gregor Popp, Munich (DE); Matthias Rank, Willmering (DE)

(73) Assignee: Schleifring und Apparatebau GmbH, Fürstenfeldbruck (DE)

( * ) Notice: Subject to any disclaimer, the term of this patent is extended or adjusted under 35 U.S.C. 154(b) by 1592 days.

(21) Appl. No.: 12/769,289

(22) Filed: Apr. 28, 2010

(65) Prior Publication Data

US 2011/0268383 A1    Nov. 3, 2011

(51) Int. Cl.
G02B 6/00 (2006.01)
G02B 6/26 (2006.01)
G02B 6/42 (2006.01)
G02B 6/36 (2006.01)
G02B 6/27 (2006.01)

(52) U.S. Cl.
CPC ........... *G02B 6/3604* (2013.01); *G02B 6/2706* (2013.01)

(58) Field of Classification Search
CPC .......................... G02B 6/3604; G02B 6/2706
USPC ............................................. 385/11, 25, 26
See application file for complete search history.

(56) References Cited

U.S. PATENT DOCUMENTS

| | | | |
|---|---|---|---|
| 4,848,867 A | 7/1989 | Kajioka et al. | |
| 5,568,578 A | 10/1996 | Ames | |
| 7,706,646 B2 * | 4/2010 | Wang et al. | 385/33 |
| 7,734,130 B2 * | 6/2010 | Popp | 385/25 |
| 2007/0237528 A1 | 10/2007 | Popp | |
| 2009/0142017 A1 | 6/2009 | Merlet et al. | |
| 2009/0279829 A1 | 11/2009 | Popp et al. | |

FOREIGN PATENT DOCUMENTS

| | | | | |
|---|---|---|---|---|
| DE | 100 29 206 A1 | 1/2002 | | |
| DE | 10 2006 022 023 A1 * | 11/2006 | | G02B 6/32 |
| EP | 0379226 A2 | 7/1991 | | |
| EP | 0 490 054 A1 | 6/1992 | | |
| EP | 0 588 039 A1 | 3/1994 | | |
| EP | 1 345 051 A2 | 9/2003 | | |
| GB | 2282503 A | 4/1995 | | |
| WO | 03/069392 A2 | 8/2003 | | |

* cited by examiner

*Primary Examiner* — Robert Tavlykaev
(74) *Attorney, Agent, or Firm* — Yakov Sidorin; Quarles & Brady LLP

(57) ABSTRACT

An optical rotating data transmission device for polarization-maintaining transmission of linearly polarized light includes at least one first collimator for coupling on first light-waveguides, and also a second collimator for coupling on second light-waveguides, the second collimator being supported to be rotatable relative to the first collimator about a rotation axis. At least two λ/4 plates for converting linear polarization to circular polarization and vice-versa are provided in between a plate for attaching optical fibers and a micro lens system.

20 Claims, 2 Drawing Sheets

POLARIZATION MAINTAINING OPTICAL ROTARY JOINT

BACKGROUND OF THE INVENTION

1. Field of the Invention

The invention relates to a device for polarization-maintaining transmission of optical signals between units that are rotatable relative to each other. This is intended preferably for simultaneous transmission of a plurality of optical signals along a plurality of channels.

2. Description of Relevant Art

High bit-rate transmission systems having data rates of 80 Gbit/s and higher preferably perform transmission of optical signals in a polarization-maintaining manner. Here light is transmitted at a defined linear polarization. Polarized light is also employed with various optical sensors. Thus, a change of the polarization of the light can be evaluated by means of measured parameters. Optical signals of this kind must frequently be transmitted between units that are rotatable relative to each other.

Various transmission systems are known for basic transmission of optical signals between units that are rotatable relative to each other.

U.S. Pat. No. 5,568,578 discloses an optical rotating data transmission device for a plurality of channels, the device including a Dove prism. The polarization of coupled-in light changes with a rotation of the two units relative to each other. Furthermore, no transmission of light is possible at constant polarization even with employed components such as light-guiding fibers or collimators.

EP 1476969 discloses a rotating data transmission device in which the light is transmitted by multiple reflections in mirror-coated trench. The polarization of the incident light is changed in an unpredictable manner by the number of reflections which varies according to position.

US 2007/0237528 A1 discloses a polarization maintaining optical Rotary coupling. Linear polarized light is converted into circular polarized light for transmission between the rotating parts. Polarization converters are held by retainers resulting in a fragile assembly. Furthermore the surfaces of the polarization converters to surrounding air cause reflections of light therefore reducing return loss.

SUMMARY OF THE INVENTION

The embodiments are based on the object of designing a rotary data transmission device for transmitting optical signals in such manner that light of a defined, approximately linear polarization can be transmitted from a first unit to a second unit whilst its polarization is maintained.

It is another object to minimize position-dependent attenuations that depend upon polarization.

Furthermore the mechanical assembly should be more rigid. The return loss should be increased.

It is a further object to provide a method for polarization-maintaining transmission of linearly polarized light between a first unit and a second unit that is rotatable relative to the first unit.

In an embodiment a polarization-maintaining optical rotary data trans-mission device for transmitting linearly polarized light is provided. It includes at least one first collimator coupled onto first light-waveguides, a second collimator coupled onto second light-waveguides and supported to be rotatable relative to the first collimator about an axis of rotation and an optical path passing between the first collimator and the second collimator. The at least one first polarization converter is disposed in the optical path to rotate jointly with the first collimator, for converting light of linear polarization to light of circular polarization; and a second polarization converter is disposed in the optical path to rotate jointly with the second collimator, for converting light of circular polarization to light of linear polarization.

Furthermore, an embodiment provides a method for polarization-maintaining transmission of linearly polarized light between a first unit and a second unit that is rotatable relative to the first unit, including the steps of: (1) collimating linearly polarized light with a first collimator of the first unit; (2) converting linearly polarized light to circularly polarized light with a first polarization converter assigned to the first unit; (3) coupling the light by free space propagation from the first unit to the second unit; (4) converting circularly polarized light to linearly polarized light with a second polarization converter assigned to the second unit; and (5) collimating linearly polarized light with a second collimator of the second unit.

BRIEF DESCRIPTION OF THE DRAWINGS

In the following, the invention will be described by way of example, without limitation of the general inventive concept, on examples of embodiment and with reference to the drawings.

Figure 1:
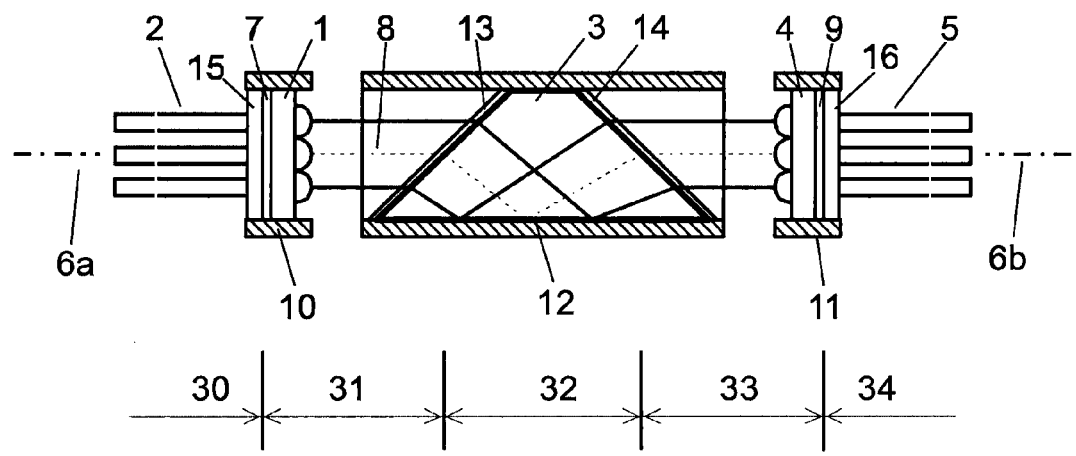
FIG. 1 schematically shows in a general form an arrangement for multiple channel transmission.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 shows in a schematic form a cross-section through an arrangement for multiple channel transmission. The optical rotating data transmission device includes a first collimator 1 for coupling on light-waveguides 2, and also a second collimator 4 for coupling on second light-waveguides 5. The collimators are shown with lenses which may be micro lenses. The second collimator 4 is supported to be rotatable relative to the first collimator 1 around a rotation axis 6a, 6b (here also referred to as a z-axis). Here the rotation axis 6 is indicated by the two line segments 6a and 6b and has not been drawn so as to pass through the entire rotating data transmission device. The collimators are oriented against each other so that there is a path of light 8 between them. Here free paths of individual light beams of 3 fibers, each assigned to a collimator lens are shown. A derotating element 3 is located in the beam path between the first collimator 1 and the second collimator 4 to compensate the rotary movement. Here the derotating element includes a Dove prism. It may also be any other derotating element like an Abbe-Koenig Prism or a fiber array. This is rotated with one half of the angular velocity of the movement between the first and the second collimator.

A first polarization converter, here shown as a λ/4 plate 7 is provided for converting the linearly polarized light from the first light-waveguide 2. This λ/4 plate is accommodated in a first retainer to form a first collimator assembly together with the first polarization converter 7 between the first collimator 1 and a first plate 15 for attaching the first light-waveguides. The orientation of the polarization converter 7 is preferably aligned in rotation to the orientation against the light-waveguide 2 in a way that the polarization axis of the polarization converter 7 and the light-waveguide 2 are shifted by 45° in order to convert linear polarized light from the first light-waveguide to light of circular polarization. In further embodiments, any other polarization converters also may be employed instead of the λ/4 plate here described by way of example. A third λ/4 plate 13 and a fourth λ/4 plate 14 are mounted at the light entering surfaces of the derotating optical element 3. These rotate synchronously with the Dove prism. The light is converted back to light of linear polarization by the third λ/4 plate 13. After passing through the derotating element, the light of linear polarization is converted back to light of circular polarization by the fourth λ/4 plate 14. The direction of polarization within the derotating element is chosen so that the light may be transmitted through the Dove prism (or another derotating element) with a minimum of attenuation. The first polarization converter may be aligned in rotation to the orientation of the base of the prism by measuring the angle of the polarization.

The second polarization converter may be aligned so as to the light changes from elliptical to circular polarization. Because the λ/4 plates are moved together with the prism, light of the same polarization always enters into the prism irrespective of its position. Therefore the light also always can be transmitted with the same attenuation irrespective of the position. Furthermore polarization remains unchanged. For the case circular polarized light would be transferred through a dove prism, this light would be converted into elliptical polarized light. Linear polarized light, as used in this embodiment, specifically if polarized parallel or in a right angle towards the reflecting surfaces of the prism will maintain its polarity. Therefore the polarity of light transferred through the optical data transmission device will not be altered. This is of particular importance when the attenuation is strongly dependent upon polarization, as is the case, for example, with reflection at mirror-finished surfaces, as occur particularly on Abbe-Koenig prisms. With this, the disadvantage of polarization-dependent attenuation of anti-reflection coatings on rotating components, in particular on the derotating element, can be avoided. Special polarization-dependent anti-reflection coatings are no longer necessary. Anyway the polarization converters at the prism are an optional embodiment. The optical Rotary joint may be used without these. Finally, the circularly polarized light is converted back to linearly polarized light by a second polarization converter, here shown as λ/4 plate 9 and can then be coupled into the second light-waveguide 5 via second collimators 4. This λ/4 plate is accommodated in a second retainer 11 to form a second collimator assembly together with the second polarization converter 9 between the second collimators 4 and a second plate 16 for attaching the second light-waveguides. For the sake of clarity the regions of different polarizations have been indicated below the illustration of the optical system. Thus, the light is linearly polarized in the regions 30, 32 and 34, and circularly polarized in the regions 31 and 33. Of course, light may be also transmitted in a direction counter to that described here. Similarly, a plurality of light rays may be simultaneously transmitted in opposite directions.

Figure 2:
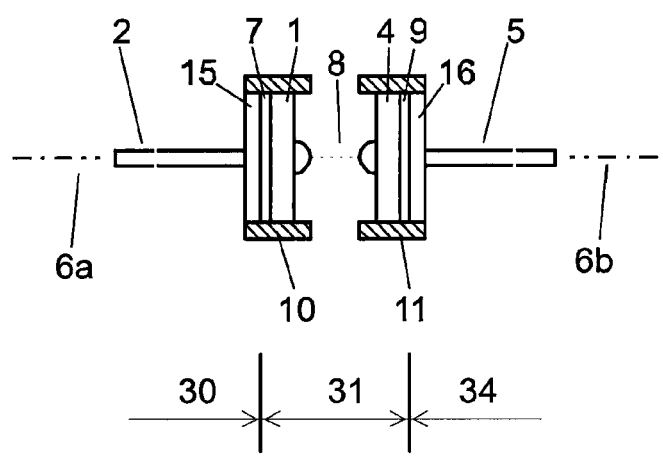
FIG. 2 schematically shows in a general form an arrangement for single channel transmission.

FIG. 2 shows an optical rotating data transmission device with only one optical path on the axis of rotation. It corresponds to the previously illustrated rotating data transmission device, but the entire structural assembly around the derotating optical element is not needed.

Figure 3:
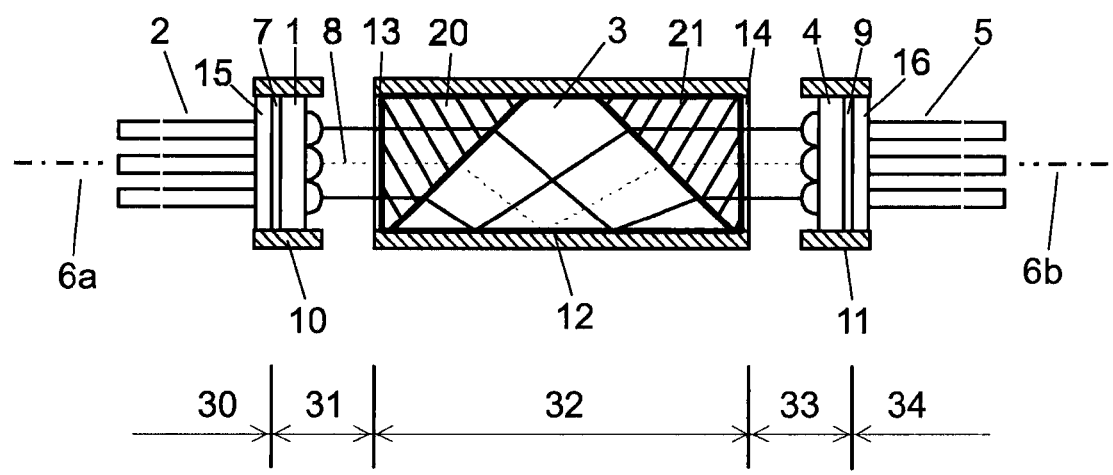
FIG. 3 schematically shows in a general form an arrangement for multiple channel transmission with additional optical elements.

FIG. 3 shows in a general form an arrangement for multiple channel transmission with additional optical elements 20, 21, which may be manufactured of glass or any other optical material. These optical elements are arranged on each side of the derotating optical element 3 and extend the surfaces of the derotating optical element 3 to surfaces which are orthogonal to the optical path. As shown here the oblique angle surfaces of the dove prism 3 are extended by the additional optical elements 20, 21 to two parallel surfaces under a right angle to the optical path. The third an fourth polarization converters 13 and 14 are attached to these surfaces. This allows the use of polarization converters with nominal thickness and therefore more common polarization converters. The drawback is the lower return loss compared to FIG. 1.

It will be appreciated to those skilled in the art having the benefit of this disclosure that this invention is believed to provide optical rotary joints and micro-optical systems, such as collimators, used for multi-channel transmission of optical signals. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The rotary joint has at least two collimators 1, 4 disposed to be rotatable relative to each other about an axis 6a, 6b. An optical path 8 for transmitting light is present between at least one first collimator 1 and at least one second collimator 4 that is disposed to be rotatable relative to the first collimator. At least two polarization converters 7, 9, preferably designed to be lambda/4 (λ/4) plates and respectively assigned to the first collimator 1 and the second collimator 4, are located in the path of light rays along the optical path. Herein the term λ/4 plates will be used for reasons of clarity of presentation. The polarization converters are mounted between the collimators and plates 15, 16 to which the light waveguides 2, 5 (optical fibers, preferably polarization maintaining fibers) are attached e.g. by gluing, bonding or welding. This results in a mechanically rigid assembly and allows the use of thin polarization converters like zero- or true zero-order wave plates. Furthermore the polarization converters are surrounded by glass, silicon, germanium or any other solid optical material, further minimizing reflections at the surfaces of the polarization converters and therefore increasing return loss. The polarization converters may be attached to a plate and/or to a lens system by gluing, bonding or welding. In general the polarization converters and the light waveguides or the light waveguides with attached collimators must be adjusted relative to each other in rotation so that the angle of polarization of the fiber fits to the polarization converter.

Light of linear polarization coupled in by a first collimator 1 through a λ/4 plate is converted to light of circular polarization. This circular polarization is invariant with respect to a rotation of the arrangement. The first λ/4 plate 7 is connected to the first collimator 1 to rotate jointly therewith. Before entering the second collimator 4 the light of circular polarization is converted back to light of linear polarization by a second λ/4 plate. The second λ/4 plate 9 is connected to the second collimator 4 to rotate jointly therewith, and is thus adapted to rotate together with this collimator relative to the first λ/4 plate 7 together with the first collimator 1.

Any type of polarization converters may be used which cause a suitable polarization conversion (linear→circular, circular→linear) of the light to be transmitted. These may be also active optical systems based on liquid crystals or even photon crystals, for example. Here λ/4 plates are understood to be thin plates of birefringent material, such as quartz, mica, or organic polymers. The thickness of the plates is chosen so that a plate introduces a relative phase shift of $\Delta\phi=n/2$ between the orthogonal o- and e-components of a wave. This phase shift of 90° converts linearly polarized light to elliptically polarized light and vice versa. In particular, linearly polarized light which is incident at an angle of 45° to one of the two major axes of a plate of this kind is converted to circularly polarized light. In this case, the amplitudes of the o- and e-components are identical. Similarly, a circularly polarized light beam is converted to a linearly polarized light beam. As a rule, λ/4 plates are designed for given wavelengths. However, they may be made to be of broader bandwidth, or designed for a plurality of wavelengths by combining plates of different materials. Thus, suitable plates for different wavelengths may also be disposed in series and if required with spacers of low birefringe material like fused silica between the plates. Instead of a trans-parent spacer a foil e.g. made of steel with an aperture can be used.

Here the term collimator is used in its broadest sense for a beam-guiding or beam-shaping element. The purpose of a collimator of this kind consists of converting the light guided in a light-waveguide, for example a single-mode fiber or also a multiple-mode fiber, to form a path of rays that can be passed through the rotating data transmission device, and in particular through the derotating element. This corresponds to a path of rays in a free space, or in an optical medium such as a gas or oil, for example. Similarly, a conversion in the opposite direction, i.e. from a path of rays in a rotating data transmission device to a light-waveguide, may be effected with a collimator. Of course, conversions in both directions inside a collimator are conceivable. A collimator may be achieved in the form of a single optical component, for example a lens, preferably a spherical lens, or even a GRIN lens, or a fiber length. Similarly, a collimator may be also a micro-optical component. Furthermore, a plurality of collimators may be assembled to form a collimator array. Especially advantageous is a combination of an array of this kind with other mechanical and/or optical components, for example for mounting the light-guiding fibers, or with a derotating element such as one or a plurality of λ/4 plates.

Basically the rotary joints may be operated in both directions, i.e. from the first collimator to the second collimator or vice versa, but also bidirectional. In the following, reference will also be made to light-entry faces, coupling-in of light etc. for the sake of simpler illustration. It is self-evident that in the case of a reversed direction of transmission these terms will apply to the corresponding light exit faces etc.

In an embodiment, one or a plurality of hollow spaces on the inside of the arrangement may be filled with air, a gas, or even a liquid such as oil. Accordingly, the term of free space propagation will also apply to one or a combination of these media. Optionally, in the case of an active optical medium the medium may perform the function of a polarization converter.

In a particularly advantageous embodiment, at least one derotating optical element 3 is located in the optical path 8 to image the light emitted by a first collimator 1 onto a second collimator 4, and similarly in the opposite direction, independently from the rotary movement between the two collimators. A derotating element of this kind may be, for example, a Dove prism or an Abbe-Koenig prism. With a derotating element of this kind, optical signals having an optical path which is not identical with the axis of rotation may be transmitted. With this, a arrangement of this kind is particularly suitable for simultaneous transmission of a plurality of optical signals.

Another advantageous embodiment provides further λ/4 plates 13, 14 that are attached to the derotating element 3 and rotate together therewith. Thus the circularly polarized light may be converted back to linear polarization before entering the derotating element. For this, a direction of polarization is preferably chosen which can be transmitted through the derotating element with the smallest losses. The polarization converters are directly attached to the light entering or leaving surfaces of the derotating element resulting in a rigid mechanical assembly and decreasing reflections at the polarization converters surfaces. Due to be incident angle the λ/4 plates 13, 14 at the derotating element may be thinner than the λ/4 plates 7, 9 attached to the collimators. The polarization converters may be attached to the derotating element by gluing, bonding or welding In another advantageous embodiment, a coupling onto the collimators 1, 4 is effected by means of polarization-maintaining fibers. Similarly, direct coupling-in, for example with a laser, would also be possible.

In another advantageous embodiment, a device is equipped with at least one collimator arrangement 1, 4 that includes a plurality of collimators in one unit, preferably a monolithic unit. A unit of this kind preferably consists of micro-optical components.

In order that reflections may be reduced, at least one λ/4 plate 7, 9, 13, 14 has an anti-reflection coating.

Furthermore, advantageously at least one λ/4 plate 7, 9, 13, 14 is tilted to be oblique to the incident beam of light. For this, the wavelength for which the plate is designed must be conformed because of the resulting larger layer thickness.

Another embodiment provides for at least two λ/4 plates 7, 9, 13, 14 of different materials to be disposed in series for transmission of a plurality of wavelengths.

A method for polarization-maintaining transmission of linearly polarized light between a first unit 1, 2, 7, 10 and a second unit 4, 5, 9, 11 that is rotatable relative to the first unit includes the following steps:

(1) feeding linearly polarized light from first polarization maintaining fibers via a first plate into a first polarization converter of the first unit;

(2) converting linearly polarized light to circularly polarized light with the first polarization converter;

(3) generating a parallel beam of light from the circular polarized light by a first lens array;

(4) coupling the light by free space propagation from the first unit to the second unit;
(5) focusing the parallel beam of light by a second lens array;
(6) converting circularly polarized light from the second lens array to linearly polarized light with a second polarization converter in the second unit; and
(7) feeding the linearly polarized light via a second plate into second polarization maintaining fibers, An advantageous further development of the method includes the following steps instead of the step (4):
(4a) coupling the light by free space propagation from the first unit to a derotating optical element 3;
(4b) derotating the light with a derotating optical element 3, such as for example a Dove prism, that rotates with one half of the angular velocity between the first and the second unit;
(4c) coupling the light from the derotating element 3 by free space propagation to the second unit.

Another advantageous development of the method includes the following steps instead of the step (3):
(3a) coupling the light by free space propagation from the first unit to a third $\lambda/4$ plate 13;
(3b) converting circularly polarized light to linearly polarized light with a third polarization converter that is attached to a first surface of the derotating optical element;
(3c) derotating the light with a derotating optical element 3, such as for example a Dove prism, that rotates with one half of the angular velocity between the first and the second unit;
(3d) converting linearly polarized light to circularly polarized light with a fourth polarization converter that is attached to a second surface of the derotating optical element;
(3e) coupling the light from a fourth $\lambda/4$ plate 14 to the second unit by free space propagation.

LIST OF REFERENCE NUMERALS

1 first collimator
2 first light-waveguide
3 derotating optical element
4 second collimator
5 second light-waveguide
6a,b rotation axis (z axis)
7 first polarization converter ($\lambda/4$ plate)
8 optical path
9 second polarization converter ($\lambda/4$ plate)
10 first retainer
11 second retainer
12 prism retainer
13 third polarization converter ($\lambda/4$ plate)
14 fourth polarization converter ($\lambda/4$ plate)
15 first plate
16 second plate
20 first optical element
21 second optical element
30 first region of linear polarization
31 first region of circular polarization
32 second region of linear polarization
33 second region of circular polarization
34 third region of linear polarization

The invention claimed is:

1. A polarization-maintaining optical rotary data transmission device configured to transmit linearly polarized light between first and second rotatably interconnected waveguides, having two collimator assemblies that are optically directed to each other and aligned along a rotational axis, and defining an optical path between said collimator assemblies, each collimator assembly including:
a plate to which a corresponding waveguide is affixed;
a polarization converter located at a first side of the plate opposing said corresponding waveguide such as to be separated from said corresponding waveguide by the plate and in optical communication with said corresponding waveguide through the plate;
a micro-optic collimator located at a side of the polarization converter opposing the plate such as to be separated from the plate by said polarization converter, said micro-optic collimator including a plurality of lenses monolithically attached to one another to form a lens unit, said lens unit adapted to couple light between the corresponding waveguide and free space while transmitting circularly polarized light, said lens unit having a surface at which said micro-optic collimator is affixed to the polarization converter;
wherein the polarization converter is mounted between the collimator and the plate by a means including one of glue, bond, and weld.

2. A device according to claim 1, wherein a polarization converter of at least one of the two collimator assemblies includes a $\lambda/4$ plate.

3. A device according to claim 2, wherein said $\lambda/4$ plate has an anti-reflection coating.

4. A device according to claim 2, wherein each polarization converter includes $\lambda/4$ plates, said $\lambda/4$ plates being made of different materials and disposed in series to transmit a plurality of wavelengths.

5. A device according to claim 1, having an axis of rotation and further comprising a derotating optical element in an optical path between the two collimator assemblies, said derotating element adapted to provide compensation for rotary movement of light transmitted between the two collimator assemblies.

6. A device according to claim 5, further comprising auxiliary polarization converters attached to light coupling surfaces of the derotating element.

7. A device according to claim 6, wherein the auxiliary polarization converters include $\lambda/4$ plates.

8. A device according to claim 6, wherein said auxiliary polarization converters are in direct contact with said light coupling surfaces.

9. A device according to claim 6, wherein, for a chosen wavelength of light transmitted between the first and second units, each of the auxiliary polarization converters has a thickness that is different from a thickness of any of polarization converters of the two collimator assemblies.

10. A device according to claim 1, wherein the light-waveguides include polarization-maintaining fibers.

11. A device according to claim 1, further comprising at least on ancillary polarization converter disposed between and in optical communication with the two collimator assemblies at an angle with respect to the rotational axis.

12. A method for polarization maintaining transmission of linearly-polarized light between a first unit and a second unit that is rotatable at angular velocity about a rotation axis and relative to the first unit, the method including the steps of:
1) receiving linearly polarized light from first polarization-maintaining fibers through the first unit comprising a first plate and passing so received light through a first polarization converter towards a first monolithic micro-optic collimator, said first polarization converter being affixed between said first plate and said first monolithic micro-optic collimator by a first affixing means that includes one or more of glue, bond, and weld,
  wherein said first monolithic micro-optic collimator includes a plurality of lenses attached to one another to form a first lens unit;
2) converting said linearly polarized light to circularly polarized light with said first polarization converter such as to transmit said circularly polarized light through the first monolithic micro-optic collimator;
3) forming a substantially collimated beam from said circularly polarized light with said lens unit;
4) traversing free space between the first and second units with the substantially collimated beam;
5) coupling the substantially collimated beam to the second unit comprising a second monolithic micro-optic collimator, a second plate, and a second polarization converter affixed between said second monolithic micro-optic collimator and said second plate by a second affixing means that includes one or more of glue, bond, and weld,
  wherein said second monolithic micro-optic collimator includes a plurality of lenses attached to one another to form a second lens unit, and
  wherein said substantially collimated beam is focused through said second polarization converter by said second lens unit to deliver linearly polarized light to said second plate; and
coupling the linearly polarized light into second polarization maintaining fibers through said second plate.

13. A method according to claim 12, wherein at least one of the first and second polarization converters includes a λ/4 plate.

14. A method according to claim 12, wherein step 4 includes:
  (4a) coupling the substantially collimated beam to a derotating optical element adapted to provide compensation for rotary movement for light transmitted between the two collimator assemblies;
  (4b) rotating spatial distribution of light coupled into the derotating element by rotating the derotating element at about a half of the angular velocity; and
  (4c) directing light that has traversed the derotating element through free space toward the second unit.

15. A method A method according to claim 14, wherein the derotating element includes a Dove prism.

16. A method according to claim 12, wherein step 4 includes:
  (4a) coupling the substantially collimated beam from the first unit to a derotating optical element adapted to provide compensation for rotary movement for light transmitted between the two collimator assemblies;
  (4b) converting polarization of light in said substantially collimated beam from circular polarization to linear polarization with a third polarization converter that is attached to a first surface of the derotating optical element;
  (4c) rotating linear polarization of light coupled into the derotating element by rotating the derotating element at about a half of the angular velocity between the first and the second unit;
  (4d) converting linear polarization of light that has traversed the derotating element to circular polarization with a fourth polarization converter that is attached to a second surface of the derotating optical element;
  (4e) directing light that has traversed the derotating element through free space toward the second unit.

17. A method according to claim 16, wherein the derotating element includes a Dove prism.

18. A method according to claim 12, wherein said traversing includes traversing third and fourth polarization converters each of which separates free space from an optical element disposed between the first and second units such that, for a chosen wavelength of light transmitted between the first and second units, at least one of the third and fourth polarization converters has a corresponding thickness that is smaller than a thickness of either one of the first and second optical converters.

19. A method according to claim 12, wherein said traversing includes traversing third and fourth polarization converters such that, for a chosen wavelength of light transmitted between the first and second units, one or more of the third and fourth polarization converters are tilted with respect to the rotational axis.

20. A polarization-maintaining optical rotary data transmission device configured to transmit linearly polarized light between first and second light-waveguides rotatable about a rotational axis with respect to one another, said device having two collimator assemblies in optical communication with each other along said rotational axis, each collimator assembly comprising:
  a plate to which a corresponding light-waveguide is affixed;
  a monolithic micro-optic collimator including a plurality of lenses monolithically attached to one another to form a lens unit, said lens unit adapted to couple light between the corresponding light-waveguide and free space and defining a surface;
  a polarization converter affixed to the plate and the surface with an affixing means including at least one of glue, weld, and bond such that the polarization converter is in optical communication with the corresponding light-waveguide through the plate and such that the lens unit is configured to transmit circularly polarized light between the first and second light-waveguides; and
  an auxiliary polarization converter disposed between the first and second units at an angle to the rotational axis.

* * * * *